April 29, 1941.  A. B. NEWTON  2,240,373
REFRIGERATION CONTROL SYSTEM
Filed March 17, 1938    3 Sheets-Sheet 1
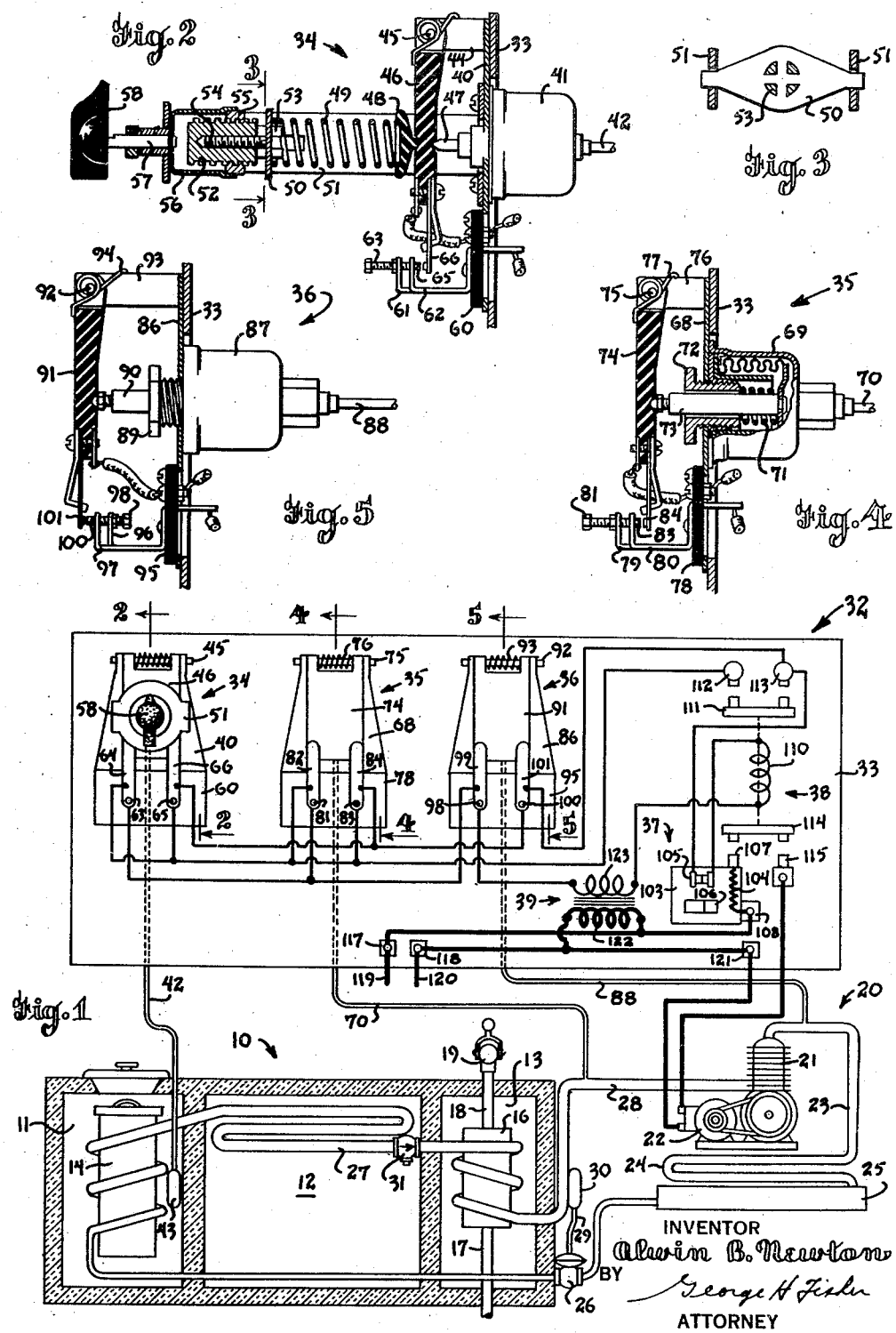
INVENTOR
Alwin B. Newton
BY George H. Fisher
ATTORNEY April 29, 1941. A. B. NEWTON 2,240,373
REFRIGERATION CONTROL SYSTEM
Filed March 17, 1938 3 Sheets-Sheet 2

INVENTOR
Alwin B. Newton
BY
George H Fisher
ATTORNEY

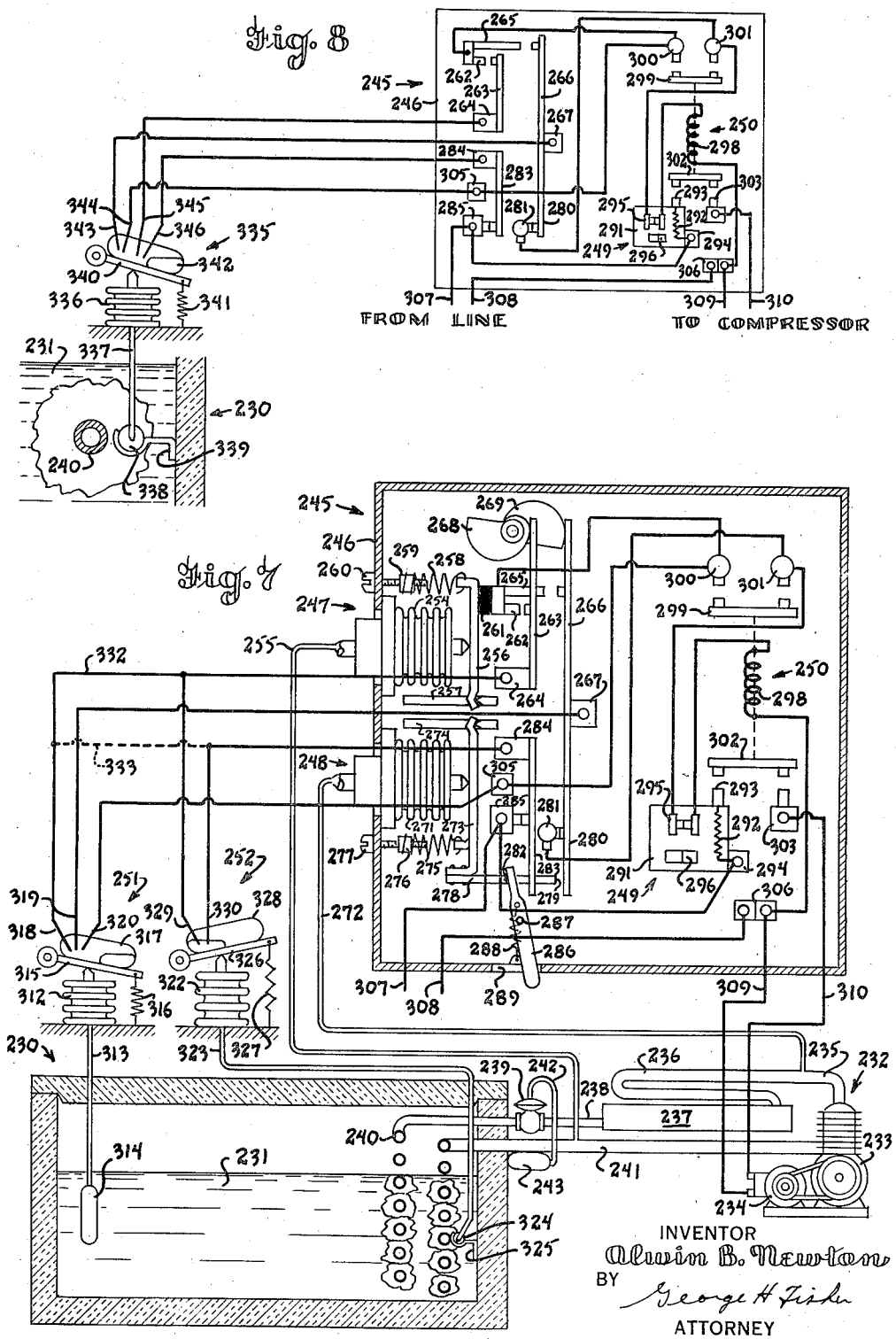

Patented Apr. 29, 1941

2,240,373

UNITED STATES PATENT OFFICE 2,240,373

REFRIGERATION CONTROL SYSTEM

Alwin B. Newton, Minneapolis, Minn., assignor to Minneapolis-Honeywell Regulator Company, Minneapolis, Minn., a corporation of Delaware Application March 17, 1938, Serial No. 196,449

30 Claims. (Cl. 62—4)

This invention is directed to refrigeration control systems in general and more particularly to refrigeration control systems where it is desired to perform two functions substantially simultaneously, one such as maintaining desired temperatures in a compartment and the other such as performing an independent cooling function.

The refrigeration control system of this invention is particularly useful in soda fountain work wherein it is desired to maintain substantially constant temperatures in a storage compartment such as a frozen confection storage compartment and also to cool a liquid such as water. The control system of this invention may also be applied to a fixture for making and storing a frozen confection, the system acting to maintain substantially constant temperatures in the storing or hardening compartment thereof and for freezing the frozen confection when desired in the freezing compartment thereof. The control system of this invention is also useful in controlling the operation of coolers such as milk coolers wherein it is desired to maintain the temperature of a cooling fluid at substantially desired values and wherein it is desirable to form ice on the coils of the milk cooler before the relatively warm milk is placed in the cooling fluid so that a reserve of refrigeration may be built up before the milk to be cooled is placed in the cooler.

An object of this invention is to provide a novel control system for these applications wherein a temperature responsive controller is arranged in parallel relationship with a pressure responsive controller responsive to the pressure on the low pressure side of the refrigerating apparatus so that the refrigerating apparatus may be placed in operation when either the temperature condition or the low side pressure rises to predetermined values and to maintain the compressor in operation until both the temperature condition and the low pressure decreases to predetermined lower values. By reason of this arrangement, the efficiency of operation of the refrigerating apparatus is greatly increased and the temperature control and cooling functions are accurately accomplished.

A further object of this invention is to include in the above control arrangement a means responsive to the pressure on the high pressure side of the refrigerating apparatus to prevent starting of the refrigerating apparatus until the high pressure decreases to a predetermined low value which acts to decrease greatly the starting torque required of the compressor motor whereby the refrigeration control system is safe guarded against the existence of high head pressures on starting.

Other objects and advantages will become apparent to those skilled in the art upon reference to the accompanying specification, claims and drawings, in which:

Figure 1 diagrammatically illustrates one form of this invention as applied to a fixture of the soda fountain type;

Figure 2 is a sectional view taken substantially along the line 2—2 of Figure 1;

Figure 3 is a sectional view taken substantially along the line 3—3 of Figure 2;

Figure 4 is a sectional view taken substantially along the line 4—4 of Figure 1;

Figure 5 is a sectional view taken substantially along the line 5—5 of Figure 1;

Figure 7 is a schematic view of still another form of this invention as applied to a fixture which may be utilized for the purpose of cooling a substance such as milk;

Figure 8 is a schematic view of another control arrangement which may be utilized for controlling the operation of the fixture of Figure 7.

Figures 6, 9:
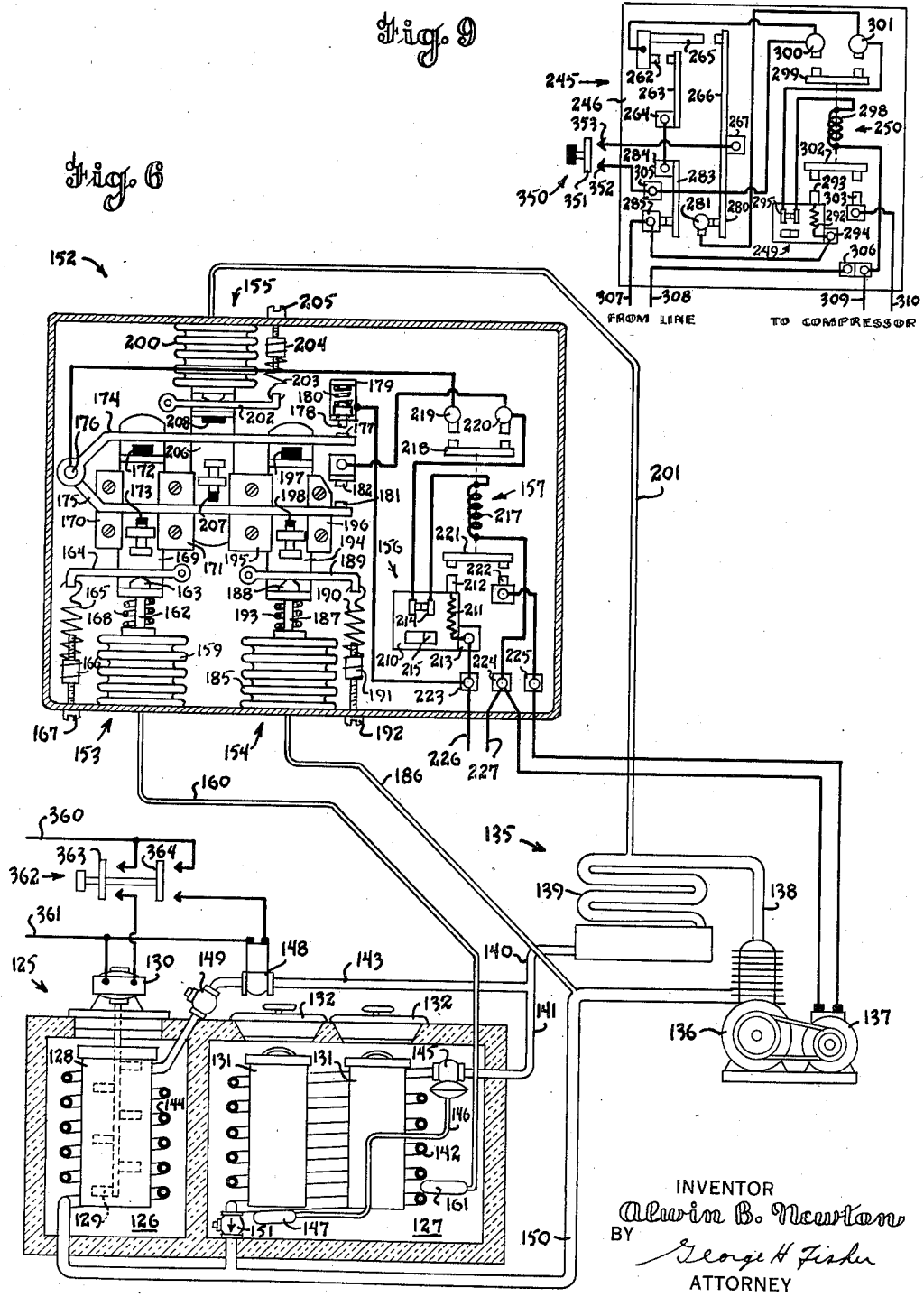
Figure 6 is a schematic view of another form of this invention as applied to a fixture which may be of the type for making and storing a frozen confection.
Figure 9 is a schematic illustration of still another form of control arrangement which may be utilized for controlling the operation of the fixture of Figure 7.

Referring now to Figure 1, the fixture is generally designated at 10 and is shown to have three compartments 11, 12 and 13. The compartment 11 may be utilized for storing a frozen confection contained in a container 14. The compartment 12 may be utilized for storing other merchandise such as bottled goods, etc. The compartment 13 is utilized for cooling a drinking fluid such as water and is shown to include a cooler 16 having a supply pipe 17 and a discharge pipe 18. A dispensing valve 19 is utilized for withdrawing cooled drinking fluid from the cooler 16.

The fixture 10 is cooled by a mechanical refrigerating apparatus generally designated at 20 and which may comprise a compressor 21 operated by an electric motor 22. Compressed refrigerant is conveyed from the compressor 21 by a high pressure line 23 to a condenser 24 wherein the refrigerant is condensed. The condensed refrigerant then flows through a receiver 25, a liquid line and an expansion valve 26 to an evaporator means 27 in the fixture 10. Expanded refrigerant is withdrawn from the evaporator means 27 through a low pressure or suction line 28 by the compressor 21. The evaporator means 27 in this instance is shown to include a plurality of series connected coils, one coil being located in the storage compartment 11, another coil in the storage compartment 12, and the last coil in the water cooler compartment 13. The expansion valve 26 is shown to be of the thermostatic expansion type and may include a bulb 30 located adjacent the discharge side of the evaporator means 27 and connected by a capillary tube 29 to the expansion valve 26. A check valve 31 may be located between the coil in the compartment 12 and the coil in the water cooler compartment 13 to prevent counterflow of refrigerant through the evaporator means 27.

The mechanical refrigerating apparatus 20 and hence the temperature conditions in the fixture 10 are controlled by a unitary control arrangement generally designated at 32, and this control arrangement may comprise a temperature responsive controller 34, a low pressure responsive controller 35, and a high pressure responsive controller 36, all suitably mounted on a common panel 33. The unitary control arrangement 32 may also include an overload cut-out 37 and a relay or starter 38 which may also be mounted on the same panel 33.

Referring now to Figures 1, 2, and 3, it is seen that the temperature responsive controller 34 may include a subbase 40 suitably secured to the panel 33 upon which is mounted a bellows assembly 41 connected by a capillary tube 42 to a bulb 43 located in the storage compartment 11. The bulb 43, tube 42, and bellows assembly 41 may include a volatile fluid so that upon an increase in temperature a plunger 47 operated by the bellows assembly 41 will move to the left as shown in Figure 2, and will move to the right upon a decrease in temperature. The subbase 40 carries a bracket 44 upon which is mounted by means of a pin 45 a lever 46 preferably made of insulating material. A spring retainer cup 48 abuts against the lever 46 and carries one end of a compression spring 49. The other end of the compression spring 49 abuts a plate 50 which is guided in slots in a bracket 51. A screw assembly 52 is provided with prongs 53 which extend through openings in the plate 50 to prevent turning thereof. A screw 54 screw-threadedly mounted in the screw assembly 52 abuts the plate 50 and provides a means for factory calibration of this portion of the unitary control arrangement. A nut 55 screw-threadedly engages the screw assembly 52 and is carried by a cup 56 rigidly secured to a shaft 57 which is suitably journaled in the bracket 51. A handle 58 is rigidly secured to the shaft 57 and provides a means for adjusting the tension in the spring 49. Upon rotation of the handle 58, the nut 55 is rotated and since the screw assembly 52 is held against rotation the plate 50 is moved either to the left or to the right, depending upon the direction of rotation of the handle 58. In this manner the force of the spring 49 is adjusted and the temperature setting of this portion of the unitary control arrangement may be adjusted at will. Also mounted on the subbase 40 is an insulating pad 60 carrying brackets 61 and 62. The bracket 61 is provided with an adjustable contact 63 for engaging a switch arm 64 carried by the lever 46 and the bracket 62 carries a contact 65 which is adapted to be engaged by a switch arm 66 also carried by the lever 46. For purposes of illustration, it is assumed that the spring 49 and the contact 63 are so adjusted that upon an increase in temperature the switch arm 64 first engages the contact 63 when the temperature of the compartment 11 increases to 5°, and that the switch arm 66 engages the contact 65 when the temperature rises to 7°. Upon a decrease in temperature, the switch arm 66 disengages the contact 65 at 7° and the switch arm 64 disengages the contact 63 at 5°.

Referring now to Figures 1 and 4, the structure of the low pressure controller 35 is shown. This low pressure controller 35 may comprise a subbase 68 to which is secured a bellows assembly 69 which is connected by a pipe 70 to the low pressure or suction line 28 of the mechanical refrigerating apparatus 20. The bellows assembly 69 includes a spring 71 which may be adjusted by an adjusting screw 72. By suitably rotating the adjusting screw 72, the tension in the spring 71 may be varied and hence the pressure setting of this portion of the unitary control arrangement may be adjusted at will. The bellows assembly 69 operates a plunger 73 which abuts a lever 74 pivoted by a pin 75 to a bracket 76 carried by the subbase 68. A spring 77 maintains the lever 74 in engagement with the plunger 73. The subbase 68 also carries a terminal board 78 upon which are mounted brackets 79 and 80. The bracket 79 carries an adjustable contact 81 which is adapted to be engaged by a switch arm 82 and the bracket 80 carries a contact 83 which is adapted to be engaged by a switch arm 84. For purposes of illustration, it is assumed that the nut 72 and the contact 81 are so adjusted that upon an increase in suction pressure, the switch arm 82 first engages the contact 81 at 25 lbs. and that the switch arm 84 engages the contact 83 at 40 lbs. Upon a decrease in pressure the switch arm 84 first disengages the contact 83 at 40 lbs. and then the switch arm 82 disengages the contact 81 at 25 lbs.

The high pressure controller generally designated at 36 is shown to comprise in Figures 1 and 5 a subbase 86 upon which is mounted a bellows assembly 87 connected by a pipe 88 to the high pressure line 23 of the refrigerating apparatus 20. The pressure setting of the bellows assembly 87 may be adjusted by an adjusting screw 89 in the same manner that adjusting screw 72 of Figure 4 adjusts its bellows assembly. The bellows assembly 87 operates a plunger 90 which is abutted by a lever 91 pivoted by a pin 92 to a bracket 93 carried by the subbase 86. A spring 94 maintains the lever 91 in engagement with the plunger 90. The subbase 86 carries a terminal board 95 upon which are mounted brackets 96 and 97. Bracket 96 carries an adjustable contact 98 which is adapted to be engaged by a switch arm 99 carried by the lever 91 and bracket 97 carries a contact 100 which is adapted to be engaged by a switch arm 101 also carried by the lever 91. For purposes of illustration, it is assumed that the adjusting screw 89 and the contact 98 are so adjusted that upon an increase in high pressure the switch arm 101 first disengages the contact 100 at 135 lbs. and then switch arm 99 disengages contact 98 at 185 lbs. Conversely, upon a decrease in high pressure the switch arm 99 first engages contact 98 at 185 lbs. and then switch arm 101 engages contact 100 at 135 lbs.

For a more thorough description of the temperature controller 34, the suction pressure controller 35, and the high pressure controller 36, reference is made to application Serial No. 147,694, filed by Leo B. Miller and William L. McGrath on June 11, 1937.

The overload cut-out generally designated at 37 may be of the type shown and described in application Serial No. 196,448 filed by Albert L. Judson on March 17, 1938. This overload cut-out is shown to comprise a casing 103 containing a heating element 104, one end of which is connected to a terminal 108 and the other to a load contact 107. The heating element is adapted to heat a thermostatic element, not shown, which allows contacts 105 to separate upon the occurrence of an overload condition. A lever 106 is provided for reengaging the contacts 105 when the overload condition no longer exists.

The relay or starter generally designated at 38 may comprise an operating coil 110 for operating a bridge member 111 with respect to contacts 112 and 113 and for operating a bridge member 114 with respect to load contacts 107 and 115. The arrangement is such that when the operating coil 110 is energized, the bridge member 111 is moved into engagement with the contacts 112 and 113 and the bridge member 114 is moved into engagement with the load contacts 107 and 115. When the relay coil 110 is deenergized, the bridge members 111 and 114 are moved out of engagement with their respective contacts by means of springs, gravity, or other means, not shown.

The unitary control arrangement 32 may be provided with power terminals 117 and 118 connected to line wires 119 and 120 leading from some source of power, not shown. The terminal 117 is connected to the terminal 108 of the overload cut-out and the terminal 118 is connected to a terminal 121. Power is supplied to the compressor motor 22 by means of conductors connected to terminal 121 and load contact 115. Power may be supplied to the control system by a step-down transformer generally designated at 39 having a primary 122 connected across the terminals 117 and 118 and a secondary 123.

With the parts in the position shown in Figure 1, the starter or relay 38 is deenergized and hence the refrigerating apparatus 20 is shut down. Assume now that the high pressure is less than 135 lbs. whereupon switch arms 99 and 101 are engaging their respective contacts 98 and 100, that the low pressure is below 25 lbs. whereupon the switch arms 82 and 84 are disengaging their respective contacts 81 and 83, and that the temperature in the compartment 11 increases to 7°, whereupon the switch arms 64 and 66 are moved into engagement with contacts 63 and 65, respectively. This completes a starting circuit for the operating coil 110 of the relay or starter 38 which may be traced from the secondary 123 through contact 98, switch arm 99, contact 63, switch arm 64, contact 65, switch arm 66, contact 100, switch arm 101, contact post 113, contacts 105 of the overload cut-out 37 and operating coil 110 back to the secondary 123. Completion of this circuit energizes the operating coil 110 to move the bridge members 111 and 114 into engagement with their respective contacts.

Movement of the bridge member 114 into engagement with contacts 107 and 115 completes a circuit from the line wire 119 through terminal 117, terminal 108, heater element 104, contact 107, bridge member 114, contact 115, compressor motor 22, terminal 121, and terminal 118 back to the other line wire 120. Completion of this circuit starts operation of the compressor 21 to deliver refrigerant to the evaporator means 27 and hence cool the compartment 11.

Movement of the bridge member 111 into engagement with contacts 112 and 113 completes a maintaining circuit for the operating coil 110 which may be traced from the secondary 39 through contact 98, switch arm 99, contact 63, switch arm 64, contact post 112, bridge member 111, contact post 113, contacts 105 of the overload cut-out 37, and operating coil 110 back to the secondary 123. Since this maintaining circuit shunts out contact 65 and switch arm 66 of the temperature controller 34 and contact 100 and switch arm 101 of the high pressure controller 36, the refrigerating apparatus is maintained in operation until the temperature of the compartment 11 decreases to 5° whereupon switch arm 64 disengages contact 63 or until the high pressure increases to 185 lbs. whereupon switch arm 99 disengages contact 98. Whenever either of these contingencies occur, the operation of the compressor motor 21 is stopped.

Assume now that the high pressure is less than 135 lbs. whereupon the switch arms 99 and 101 engage the contacts 98 and 100, that the temperature of the compartment 11 is less than 5° whereupon the switch arms 64 and 66 are out of engagement with their respective contacts 63 and 65, and that the low pressure increases to 40 lbs. whereupon the switch arms 82 and 84 move into engagement with their respective contacts 81 and 83. This completes a starting circuit for the operating coil 110 of the relay or starter 38 which may be traced from the secondary 123 through contact 98, switch arm 99, contact 81, switch arm 82, contact 83, switch arm 84, contact 100, switch arm 101, contact post 113, contacts 105 of the overload cut-out 37, and operating coil 110 back to the secondary 123. Completion of this circuit energizes the operating coil 110 and moves the bridge members 111 and 114 into engagement with their respective contacts. Movement of the switch arm 114 into engagement with contacts 107 and 115 completes a circuit to the compressor motor 22 to cause operation of the compressor 21 and consequent delivery of refrigerant to the evaporator means 27.

Movement of the bridge member 111 into engagement with contacts 112 and 113 completes a maintaining circuit for the operating coil 110 which may be traced from the secondary 123 through contact 98, switch arm 99, contact 81, switch arm 82, contact post 112, bridge member 111, contact post 113, contacts 105 of the overload cut-out 37, and operating coil 110 back to the secondary 123. Completion of this circuit maintains the relay or starter 38 energized and hence the compressor in operation until the high pressure increases to 185 lbs., whereupon the switch arm 99 disengages the contact 98 or until the low pressure decreases to 25 lbs., whereupon the switch arm 82 disengages the contact 81. When either of these contingencies occurs, the compressor is shut down.

The above sequence of control of the refrigerating apparatus by the temperature responsive controller 34 was predicated on the fact that the low pressure was below 25 lbs., whereupon the switch arms 82 and 84 of the low pressure controller 35 were separated from their respective contacts 81 and 83, and likewise the above outlined control of the refrigerating apparatus by the low pressure controller 35 was predicated on the fact that the temperature of the compartment 11 was below 5°, whereupon the switch arms 64 and 66 of the temperature responsive controller 34 were separated from their respective contacts 63 and 65. It may well happen that the temperature of the compartment 11 may be between 5° and 7°, such as 6°, to cause the switch arm 64 of the temperature responsive controller 34 to engage the contacts 63 when the low pressure rises to 40 lbs. to cause the switch arms 82 and 84 thereof to engage their respective contacts 81 and 83. Under these conditions, the refrigerating apparatus is started by the above outlined starting circuit and after it is once started the compressor is maintained in operation by two parallel maintaining circuits, one circuit being through the contact 81 and switch arm 82 of the low pressure controller 35 and the other passing through the contact 63 and switch arm 64 of the temperature responsive controller 34. Accordingly, when the refrigerating apparatus is placed in operation upon an increase in low pressure to 40 lbs., the compressor is maintained in operation until both the low pressure is decreased to 25 lbs. and the temperature of the compartment 11 is decreased to 5°. With different pressure and temperature settings, it may be possible that after the temperature has decreased to the cut-out value, the suction pressure may still be at an intermediate value which through the maintaining circuit of the suction pressure controller will maintain the refrigerating apparatus in operation until the suction pressure is decreased to the cut-out value.

Summarizing briefly the operation of Figure 1, it is seen that the refrigerating apparatus is placed in operation when the high pressure decreases to a predetermined low value (135 lbs.) and either the low pressure rises to a predetermined high value (40 lbs.) or the temperature of the compartment 11 increases to a predetermined high value (7°) and is maintained in operation until either the high pressure rises to a predetermined higher value (185 lbs.) or both the low pressure decreases to a predetermined lower value (25 lbs.) and the temperature of the compartment 11 decreases to a predetermined lower value (5°).

Under normal conditions, that portion of the evaporator means 27 which cools the cooler 16 contains a certain amount of liquid refrigerant, the pressure thereof being dependent upon the temperature of the water being cooled. When cool water is drawn from the cooler 16 by the dispenser 19, warm water flows into the cooler 16 through the supply pipe 17 which greatly increases the temperature in that portion of the evaporating means 27 thereby vaporizing the liquid refrigerant therein. This increases the low pressure and through the low pressure responsive controller 35 causes operation of the compressor 21 in the manner pointed out above. In order to insure that the compressor 21 will start upon the drawing of fluid from the cooler 16, the check valve 31 may be utilized for preventing this increase in low pressure from backing up through the remainder of the evaporator 27. Since the overload cut-out 37 is included in series with both the starting and maintaining circuits, the refrigerating apparatus is shut down upon the occurrence of overload conditions in the compressor motor 22.

By preventing starting of the refrigerating apparatus until the high pressure has decreased to a predetermined value of, say 135 lbs., as illustrated, starting of the compressor against high head pressures is prevented which eliminates one of the primary causes of overloading of the compressor motor 22. By starting the refrigerating apparatus when the temperature of the compartment 11 rises to 7° or when the low pressures rises to 40 lbs., the maintenance of desired temperature conditions in the compartment 11 and the maintenance of sufficient cooling capacity for cooling the fluid cooler 16 is assured. By continuing the refrigerating apparatus in operation until both the temperature decreases to 5° and the low pressure decreases to 25 lbs., the efficiency of the refrigerating apparatus is greatly increased, because the system operates under higher suction pressures with fewer operations.

Referring now to Figure 6, there is disclosed another form of this invention for accomplishing a slightly different mode of operation. This form of invention is shown as applied to a fixture generally designated at 125 which may be of the type for making and storing a frozen confection. This fixture 125 is shown to include a freezing compartment 126 and a storing or hardening compartment 127. Located in the freezing compartment 126 is a container 128 having a suitable agitator 129 driven by a motor 130. Located in the storing or hardening compartment 127 are shown two containers 131 which contain the frozen confection which may have been made in the container 128. Suitable covers 132 may be provided for allowing access to the containers 131.

The fixture 125 is cooled by a mechanical refrigerating apparatus generally designated at 135 which may comprise a compressor 136 operated by an electric motor 137. Compressed refrigerant is circulated from the compressor 136 through a high pressure line 138 to a condenser 139 wherein the refrigerant is condensed. Liquid refrigerant flows from the condenser 139 through a receiver and through a liquid line 140 to the evaporator means located in the fixture 125. In this instance the evaporator means is shown to comprise two coils connected in parallel with respect to each other, one coil 142 located in the storage compartment 127 receiving liquid refrigerant through a branch liquid line 141 and the other coil 144 located in the freezing compartment 126 receiving its supply of liquid refrigerant through a branch liquid line 143. The supply of refrigerant to the coil 142 is controlled by a thermostatic expansion valve 145 having a capillary tube 146 connected to a bulb 147 located adjacent the discharge side of the evaporator coil 142. If desired, the bulb 147 may be attached to the suction line on the outside of the compartment 127. The supply of refrigerant to the other evaporator coil 144 is controlled by a solenoid valve 148 and an expansion valve 149. The two evaporator coils 142 and 144 connect into a common low pressure or suction pressure line 150 which leads to the compressor 136. A check valve 151 may be interposed between the low pressure line 150 and the evaporator coil 142 located in the storage or hardening compartment 127.

The refrigerating apparatus 135 may be controlled by a unitary control arrangement generally designated at 152, and this control arrangement includes a temperature responsive controller 153, a low pressure responsive controller 154, a high pressure responsive controller 155, an overload cut-out 156, and a relay or starter 157.

The temperature responsive controller 153 of the unitary control arrangement 152 may comprise a bellows 159 connected by a capillary tube 160 to a bulb 161 located in the storage compartment 127. The bulb 161, the tube 160, and the bellows 159 are preferably charged with a volatile fluid so that the bellows 159 is actuated in accordance with temperature changes existing within the storage or hardening compartment 127. The bellows 159 carries a plunger 162 which in turn carries an abutment 163. A pivoted lever 164 engages the abutment 163 and is biased in a counter-clockwise direction by a spring 165. One end of the spring 165 is connected to the lever 164 and the other end is connected to a nut 166 screw-threadedly mounted on a screw 167. By suitably adjusting the tension in the spring 165 by rotating the screw 167, the temperature setting of the bellows 159 may be adjusted at will. One end of a compression spring 168 engages the bellows 159 and the other end urges a member 169 into engagement with the abutment 163. The member 169 is guided for sliding movement in guides 170 and 171 and carries stops 172 and 173 preferably made of insulating material. The stop 173 may be made adjustable as shown. The stops 172 and 173 are adapted to engage arms 174 and 175, respectively, which are pivoted upon a common pivot 176. The arm 174 carries a contact 177 which is adapted to engage a resilient contact 178, the resilient contact 178 being urged downwardly by a spring 180 carried by a stationary bracket 179. The arm 175 carries a contact 181 which is adapted to engage stationary contact 182. For purposes of illustration, it is assumed that the spring 165 and the abutment 173 are so adjusted that upon an increase in temperature in the storage compartment 127 the contact 177 is first moved into engagement with the contact 178 at 5°, and that the contact 181 is next moved into engagement with the contact 182 at 7°, this last movement being permitted by the resilient mounting of the contact 178. Upon a decrease in temperature within the storage or hardening compartment 127, the contact 181 first disengages the contact 182 at 7° and then the contact 177 disengages the contact 178 at 5°.

The low pressure responsive controller generally designated at 154 may comprise a bellows 185 connected by a pipe 186 to the low pressure or suction line 150 of the mechanical refrigerating apparatus. The bellows 185 carries a plunger 187 which in turn carries an abutment 188. The abutment 188 is urged downwardly by a pivoted arm 189 and a spring 190. One end of the spring 190 is connected to the arm 189 and the other end is connected to a nut 191 screw-threadedly mounted on a screw 192. By suitably rotating the screw 192, the tension in the spring 190 may be adjusted to adjust the pressure setting of the bellows 185. One end of a compression spring 193 engages the bellows 185 and urges a member 194 into engagement with the abutment 188. The member 194 is mounted in guides 195 and 196 for longitudinal movement and carries abutments 197 and 198 preferably made of insulating material. As shown, the abutment 198 is made adjustable. For purposes of illustration, it is assumed that the spring 190 and the abutment 198 are so adjusted that upon an increase in low pressure the contact 177 is first moved into engagement with the contact 178 when the low pressure rises to 7 lbs., and then the contact 181 is moved into engagement with the contact 182 when the low pressure rises to 15 lbs. Conversely, upon a decrease in low pressure the contact 181 is first moved out of engagement with contact 182 at 15 lbs., and then the contact 177 is moved out of engagement with the contact 178 at 7 lbs. Suitable stops, not shown, may be provided for limiting the upward movement of the levers 164 and 189.

The high pressure controller generally designated at 155 may comprise a bellows 200 connected by a pipe 201 to the high pressure line 138 of the mechanical refrigerating apparatus. The bellows 200 abuts against a pivoted lever 202 which is biased upwardly by a spring 203. One end of the spring 203 is connected to the lever 202 and the other end is connected to a nut 204 screw-threadedly mounted on a screw 205. By suitably rotating the screw 205, the tension in the spring 203 may be adjusted to adjust the pressure setting of the bellows 200. The bellows 200 carries for movement therewith a member 206 which is guided in the guides 171 and 195. The member 206 carries abutments 207 and 208 preferably made of insulating material. The abutment 207 may be made adjustable. For purposes of illustration, it is assumed that the spring 203 and the abutment 207 are so adjusted that upon an increase in high pressure, the abutment 207 first moves the contact 181 out of engagement with the contact 182 at 135 lbs., and the abutment 208 then moves the contact 177 out of engagement with the contact 178 at 185 lbs. Conversely, upon a decrease in high pressure the abutment 208 allows movement of the contact 177 into engagement with contact 178 at 185 lbs., and the abutment 207 allows movement of the contact 181 into engagement with the contact 182 at 135 lbs. Movement of the contacts 177 and 181 out of engagement with their respective contacts 178 and 182 by the abutments 208 and 207 is permitted by the strain release springs 168 and 193 of the temperature controller 153 and the low pressure controller 154, respectively.

From the above it is seen that the contact 177 is moved into engagement with the contact 178 when the high pressure is less than 185 lbs. and when either the temperature of the compartment 127 rises to 5° or the low pressure rises to 7 lbs., and that the contact 181 is moved into engagement with the contact 182 when the high pressure decreases to 135 lbs. and either the temperature of the compartment 127 rises to 7° or the low pressure rises to 15 lbs.

The overload cut-out 156 may be of the same construction as the overload cut-out 37 of Figure 1 and is shown for purposes of illustration to include a casing 210, a heater element 211 connected between a load contact 212 and a terminal 213, contacts 214 which are separated upon an overload condition and a reset lever 215 for reengaging the contacts 214 when the overload condition no longer occurs.

The relay generally designated at 157 may comprise an operating coil 217 for operating a bridge member 218 with respect to contact posts 219 and 220 and bridge member 221 with respect to load contacts 212 and 222. The arrangement is such that when the operating coil 217 is energized the bridge member 218 engages the contact posts 219 and 220 and the bridge member 221 engages the load contacts 212 and 222. When the operating coil 217 is deenergized, the bridge members 218 and 221 are moved out of engagement with their respective contacts by means of springs, gravity, or other means, not shown. The unitary control arrangement may also be provided with terminals 223, 224, and 225. Line wires 226 and 227 leading from some source of power, not shown, are connected to the terminals 223 and 224 and the terminals 224 and 225 are connected to the compressor motor 137.

Power is supplied to the agitator motor 130 and the solenoid valve 148 by means of line wires 360 and 361 leading from some source of power, not shown, and the supply of power to the agitator motor 130 and the solenoid valve 148 is controlled by a manual switch generally designated at 362. This manual switch 362 may comprise a switch 363 for completing a circuit to the agitator motor 130 when closed and a switch 364 for completing a circuit to the solenoid valve 148 when closed. These switches are manually closed substantially simultaneously to cause simultaneous operation of the agitator motor 130 and opening of the solenoid valve 148 when a mix of confection to be frozen is placed within the container 128. When this occurs, liquid refrigerant flows into the evaporator coil 144 and since the absorption of heat by the relatively warm mix is relatively great, the evaporator pressure will rise to a predetermined value, such as 15 lbs.

Assume the parts in the position shown in Figure 6 with the freezing device out of operation and with the relay or starter 157 deenergized. Assume now that the high pressure decreases to 135 lbs. and that the temperature of the storage or hardening compartment rises to 7°. This results in movement of contact 177 into engagement with contact 178 and movement of contact 181 into engagement with contact 182 to complete a starting circuit for the operating coil 217 of the relay or starter 157, which may be traced from the line wire 226, through terminal 223, contacts 178 and 177, arm 174, arm 175, contacts 181 and 182, contact post 220, contacts 214 of the overload cut-out 156, operating coil 217, and terminal 224 back to the other line wire 227. Completion of this circuit energizes the operating coil 217 to move the bridge member 218 into engagement with contact posts 219 and 220 and to move the bridge member 221 into engagement with load contacts 212 and 222.

Movement of the bridge member 221 into engagement with load contacts 212 and 222 completes a load circuit for the compressor motor 137 which may be traced from the line wire 226 through terminal 223, terminal 213, heated element 211, contact 212, bridge member 221, contact 222, terminal 225, compressor motor 137, and terminal 224 back to the other line wire 227. Completion of this circuit operates the compressor motor 137 and hence the refrigerating apparatus 135 which decreases the temperature within the storage or hardening compartment 127.

Movement of the bridge member 218 into engagement with the contact posts 219 and 220 completes a maintaining circuit for the operating coil 217 of the starter or relay 157 which may be traced from the line wire 226 through terminal 223, contacts 178 and 177, arm 174, terminal posts 219, bridge member 218, terminal posts 220, contacts 214 of the overload cut-out 156, operating coil 217, and terminal 224 back to the other line wire 227. Completion of this maintaining circuit maintains the relay or starter 156 energized until either the high pressure rises to 185 lbs. or the temperature of the storage compartment 127 decreases to 5°, at which time the contact 177 disengages the contact 178.

Assuming now that a mix of confection to be frozen is placed in the container 128 and that the manual switch 362 is closed to operate the agitator 129 and open the solenoid valve 148. As a result, the low pressure of the refrigerating apparatus increases to 15 lbs. and when the high pressure has decreased to 135 lbs., contact 177 is moved into engagement with the contact 178 and the contact 181 is moved into engagement with the contact 182. This completes the above outlined starting circuit for the compressor motor 137 to place the refrigerating apparatus in operation and also completes the above referred to maintaining circuit to continue the refrigerating apparatus in operation. The refrigerating apparatus will then continue in operation until either the high pressure rises to 185 lbs. or until both the low pressure decreases to 7 lbs. and the temperature of the storage compartment 127 decreases to 5°.

The check valve 151 prevents the backing up of refrigerant into the evaporator coil 142 of the hardening compartment 127 and hence prevents heating of the hardening compartment 127. When the freezing of the mix in the container 128 is completed, the switch 362 is opened to stop operation of the agitator motor 130 and to close the solenoid valve 148 whereupon the low pressure is decreased and the control of the refrigerating apparatus is restored fully to the temperature responsive controller 153 of the unitary control arrangement 152. Since the overload cut-out 156 is included in both the starting and maintaining circuits for the starter or relay 157, the refrigerating apparatus will be shut down upon the occurrence of overload conditions. Since the refrigerating apparatus cannot be placed in operation until the high pressure has been reduced to 135 lbs., it is impossible to start the refrigerating apparatus against high head pressures and hence one of the main reasons for overload conditions is thereby obviated.

From the above, it is seen that in this modification as in the preceding modification, a control arrangement is provided wherein the refrigerating apparatus is placed in operation when the high pressure decreases to a predetermined value (135 lbs.), and when either the low pressure increases to a predetermined value (15 lbs.) or the temperature of the hardening or storage compartment increases to a predetermined value (7°), and is maintained in operation until either the high pressure increases to a predetermined higher value (185 lbs.) or both the temperature of the compartment 127 decreases to a predetermined lower value (5°) and the low pressure decreases to a predetermined lower value (7 lbs.). Accordingly, it is obvious that the control arrangement of Figure 6 could well be utilized for controlling the fixture of Figure 1 and the control arrangement of Figure 1 could well be utilized for controlling the fixture of Figure 6.

Referring now to Figure 7, there is disclosed a fixture generally designated at 230 which may be used for the purpose of cooling a substance such as milk. This fixture 230 may comprise a chamber in which is located a quantity of cooling fluid 231, such as water. The substance to be cooled is placed or immersed in the water and the water cools the same. The water or cooling fluid is cooled by a mechanical refrigerating apparatus generally designated at 232 and may comprise a compressor 233 operated by an electric motor 234.

The compressed refrigerant is led from the compressor 233 through a high pressure line 235 to a condenser 236 wherein it is condensed. The condensed refrigerant flows from the condenser 236 through a receiver 237, a liquid line 238 and an expansion valve 239 into an evaporator means 240 located within the fixture 230. Evaporated refrigerant is withdrawn from the evaporator means 240 through a suction or low pressure line 241 by the compressor 232. The expansion valve 239 may be a thermostatic expansion valve connected by a capillary tube 242 to a bulb 243 located on the discharge of the evaporator means 240.

The refrigerating apparatus may be controlled by a unitary control arrangement generally designated at 245 which may be of the type shown and described in application Serial No. 196,447 filed by Albert L. Judson and Carl G. Kronmiller on March 17, 1938. For purposes of illustration, this unitary control arrangement 245 is shown to comprise a base 246 upon which are mounted a low pressure responsive controller 247, a high pressure responsive controller 248, an overload cut-out device 249, and a starter or relay 250. The refrigerating apparatus may also be controlled by a temperature responsive controller 251 responsive to the temperature of the cooling fluid and a temperature responsive controller 252 responsive to the depth of ice formation on the evaporator means 240.

The low pressure responsive controller 247 may comprise a bellows 254 connected by a pipe 255 to the low pressure line 241 of the refrigerating apparatus. The bellows 254 operates a lever 256 pivoted on a fulcrum member 257 against the action of a tension spring 258. One end of the tension spring 258 is connected to the lever 256 and the other end is connected to a nut 259 screw-threadedly mounted on a screw 260. By adjusting the screw 260, the pressure setting of the bellows 254 may be adjusted at will. The lever 256 carries an insulating pad 261 which in turn carries contacts 262 and 265 which are electrically connected together. The contact 262 is adapted to engage a contact member 263 carried by a terminal 264, and the contact 265 is adapted to engage a contact member 266 carried by a terminal 267. The positions of the contact members 263 and 266 may be adjusted by concentrically located cams 268 and 269 which are adjusted independently with respect to each other. For purposes of illustration, it is assumed that the cams 268 and 269 and the spring 258 are so adjusted that upon an increase in low pressure, the contact 262 first engages the contact member 263 at 18 lbs., and that the contact 265 then engages the contact member 266 at 28 lbs. Conversely, upon a decrease in low pressure, the contact 265 first disengages the contact member 266 at 28 lbs., and then the contact 262 disengages contact member 263 at 18 lbs.

The high pressure controller 248 may comprise a bellows 271 connected by a pipe 272 to the high pressure line 235 of the mechanical refrigerating apparatus. The bellows 271 operates a lever 273 pivoted on a fulcrum member 274 against the action of a tension spring 275. One end of the tension spring 275 is connected to the lever 273 and the other end is connected to a nut 276 screw-threadedly mounted on a screw 277. By rotating the nut 277, the tension in the spring 275 may be adjusted to adjust the pressure setting of the bellows 271. The lever 273 carries an abutment member 278 having an abutment surface 279 which engages a contact member 280 also carried by the terminal 267. The contact member 280 is adapted to engage and disengage a contact post 281. The abutment member 278 is also provided with an abutment surface 282 which is adapted to engage a contact member 283 carried by terminal 284. The contact member 283 is adapted to engage and disengage a contact terminal 285. For purposes of illustration, it is assumed that the tension spring 275 is so adjusted that upon an increase in high pressure, the contact member 280 is first moved out of engagement with the contact post 281 when the high pressure rises to 135 lbs., and that the contact member 283 disengages the contact terminal 285 when the high pressure rises to 185 lbs. Conversely, upon a decrease in high pressure the contact member 280 first engages the contact post 281 at 185 lbs., and then the contact member 283 engages the contact terminal 285 at 135 lbs.

If it be desired to prevent automatic engagement of the contact member 283 with contact post 285, subsequent to the occurrence of a high pressure of 185 lbs. which disengages these contacts, a manual reset mechanism may be provided. This reset mechanism may comprise a lever 286 pivoted at 287 and extending between the abutment urface 282 and the contact member 283. A spring 288 is utilized for snapping the lever 286 over-center. If desired, the lever 286 may extend through an opening 289 in the base 246 so that manual resetting from the outside of the instrument may be provided. Assume that the high pressure rises to 185 lbs., the lever 286 is rotated in a clockwise direction to move the spring 288 past the pivot point 287, whereupon the lever 286 snaps the contact member 283 away from the contact 285 and upon subsequent decrease in high pressure which moves the abutment member 278 to the left, as viewed in Figure 7, the lever 286 will hold the contact member 283 out of engagement with contact 285. In order to again allow the contact member 283 to engage the contact terminal 285, the lever 286 must be manually manipulated to the position shown in Figure 7.

The overload cut-out generally designated at 249 may be the same as the overload cut-out 37 of Figure 1, and is shown in this modification to comprise a casing 291, a heater element 292 connected between a load contact 293, and a terminal 294, contacts 295 which are separated by a thermostatic element upon the occurrence of an overload condition and a reset lever 296 for re-engaging the contact 295 when the overload condition no longer occurs.

The relay or starter generally designated at 250 may comprise an operating coil 298 for operating a bridge member 299 with respect to contact posts 300 and 301 and bridge member 302 with respect to load contacts 293 and 303. The arrangement is such that upon energization of the operating coil 298, the bridge member 299 is moved into engagement with the contacts 300 and 301 and the bridge member 302 is moved into engagement with contacts 293 and 303. Upon deenergization of the operating coil 298, the bridge members 299 and 302 are moved out of engagement with their respective contacts by means of springs, gravity, or other means, not shown. The unitary control arrangement 245 is also provided with a control terminal 305 which is connected electrically to the contact post 300 and with a terminal 306. Line wires 307 and 308 lead from some source of power, not shown, and are connected to contact terminal 285 and terminal 306, respectively. Terminal 306 and load contact 303 are connected by wires 309 and 310 to the compressor motor 234.

The temperature responsive controller 251 responding to the temperature of the cooling fluid may comprise a bellows 312 connected by a capillary tube 313 to a bulb 314 which is immersed in the cooling fluid. The bulb 314, tube 313, and bellows 312 may be charged with a volatile fluid so that the bellows is expanded and contracted in accordance with temperature changes of the cooling fluid. The bellows 312 operates a pivoted lever 315 against the action of a tension spring 316. By suitably adjusting the tension of the spring 316, the temperature setting of the bellows 312 may be adjusted at will. The lever 315 operates a mercury switch 317 which is provided with electrodes 318, 319, and 320. For purposes of illustration, it is assumed that the spring 316 is so adjusted that upon an increase in temperature of the cooling fluid to 38° the mercury switch 317 is tilted to cause the mercury to bridge the electrodes 318, 319, and 320, and when the temperature of the cooling fluid decreases to 35° the mercury is caused to separate from these three electrodes.

The temperature responsive controller 252 which responds to the depth of formation of ice on the evaporator means 240 may comprise a bellows 322 connected by a capillary tube 323 to a bulb 324. The bulb 324 is carried by a bracket 325 preferably mounted on a side wall of the fixture 230 to hold the bulb 324 a predetermined distance away from the surface of the evaporator means 240. The bulb 324 is adapted to be contacted by ice formed on the evaporating means 240 and under certain circumstances it is adapted to be completely surrounded by ice. The bulb 324, tube 323, and bellows 322 are charged with a volatile fluid so that the bellows 322 will be expanded and contracted in accordance with temperature changes affecting the bulb 324. The bellows 322 operates a pivoted lever 326 against the action of a tension spring 327. By suitably adjusting the tension in the spring 327, the temperature setting of the bellows 322 may be adjusted at will. The pivoted lever 326 operates a mercury switch 328 provided with electrodes 329 and 330. For purposes of illustration, it is assumed that the tension spring 327 is so adjusted that upon an increase in temperature to 31°, the mercury switch 328 is moved to the position shown to cause the mercury to bridge electrodes 329 and 330 and when the temperature decreases to 30°, the mercury is caused to separate from the electrodes 329 and 330. As long as the bulb 324 is exposed to the cooling fluid 231 in the fixture 230, its temperature will be above 31° and hence the electrodes 329 and 330 will be bridged but when the ice formation completely surrounds the bulb 324 the temperature of the bulb may decrease to 30° to cause the switch 328 to operate to unbridge the electrodes 329 and 330. Hence the controller 252 is responsive to the depth of ice formation on the evaporator means 240.

Assume the parts in the position shown in Figure 7, the ice formation has not completely enclosed the bulb 324 and hence the mercury switch 328 of the temperature responsive controller 252 is closed, the temperature of the cooling fluid is below 35° so that the mercury switch 317 of the temperature responsive controller 251 is opened and the relay or starter 250 is deenergized with the refrigerating apparatus consequently shut down. Assume now that the high pressure decreases to 135 lbs. to cause the contact member 283 to engage the contact post 282 and the contact member 280 to engage the contact post 281, and that the low pressure increases to 28 lbs. to cause contact 262 to engage contact member 263 and contact 265 to engage contact member 266. As a result, a starting circuit for the operating coil 298 of the relay or starter 250 is completed and this starting circuit may be traced from the line wire 307 through contact terminal 285, contact member 283, terminal 284, electrodes 330 and 329 of the temperature responsive controller 252, terminal 264, contact member 263, contacts 262 and 265, contact member 266, terminal 267, contact member 280, contact post 281, contact post 301, contacts 295 of the overload cut-out 249, operating coil 298, and terminal 306 back to the other line wire 308. Completion of this starting circuit energizes the operating coil 298 to move the bridge member 299 into engagement with the contact posts 300 and 301 and to move the bridge member 302 into engagement with the load contacts 293 and 303.

Movement of the bridge member 302 into engagement with the load contacts 293 and 303 completes a load circuit for the compressor motor 324 which may be traced from the line wire 307 through contact terminal 285, terminal 294, heater element 292, load contact 293, bridge member 302, load contact 303, wire 310, compressor motor 234, wire 309, and terminal 306 back to the other line wire 308. Completion of this circuit operates the compressor motor and hence operates the refrigerating apparatus to reduce the low pressure.

Movement of the bridge member 299 into engagement with the contact posts 300 and 301 completes a maintaining circuit for the operating coil 298 of the relay or starter 250 which is independent of the contact members 266 and 280 and which may be traced from the line wire 307 through contact terminal 285, contact member 283, terminal 284, electrodes 330 and 329 of the temperature responsive controller 252, terminal 264, contact member 263, contact 262, contact posts 300, bridge member 299, contact post 301, contacts 295 of the overload cut-out 249, operating coil 298, and terminal 306 back to the other line wire 308. Completion of this circuit maintains the operating coil 298 energized and hence the refrigerating apparatus in operation until either the high pressure increases to 185 lbs. which would separate contact member 283 from contact 285, or until the low pressure decreases to 18 lbs. which would cause contact 262 to disengage contact member 263, or until the ice formation completely encircles the bulb 324 which would cause separation of the mercury from the electrodes 329 and 330 of the temperature responsive controller 252. In this manner, the refrigerating apparatus is operated in accordance with low pressure to build up a predetermined thickness of ice formation on the evaporator means 240. Thus the suction pressure is maintained at higher values during this freezing operation than it would be if no suction pressure controller were used, resulting in greater economy. The suction pressure controller prevents the ice formation from getting too cold whereby cracking and spalling of the ice formation off of the evaporator means is prevented.

Assume now that the ice formation is not completely surrounding the bulb 324 whereupon the switch 328 of the temperature responsive controller 252 is closed, that the low pressure is below 28 lbs. whereupon the contact 265 is not engaging the contact member 266, and that the relatively warm substance to be cooled is placed in the cooling fluid 231. As a result, the temperature of the cooling fluid will increase and when it has increased to 38°, the mercury switch 317 of the temperature responsive controller 251 is tilted to cause the mercury therein to bridge the electrodes 318, 319, and 320. If the high pressure has decreased to 135 lbs., so as to cause both contact members 280 and 283 to engage their respective contacts 281 and 285, a starting circuit for the operating coil 298 of the starter or relay 250 is completed from the line wire 307 through contact terminal 285, contact member 283, terminal 284, electrodes 330 and 329 of the temperature responsive controller 252, wire 332, terminals 318 and 319 of the mercury switch 317, terminal 267, contact member 280, contact post 281, contact post 301, contacts 295 of the overload cut-out 249, operating coil 298, and terminal 306 back to the other line wire 308. Completion of this circuit energizes the relay or starter 250 to move the bridge member 299 into engagement with the contacts 300 and 301 and the bridge member 302 with the contacts 293 and 303.

Movement of the bridge member 302 into engagement with contacts 293 and 303 causes operation of the compressor 233 in the manner outlined above. Movement of the bridge member 299 into engagement with the contact posts 300 and 301 completes a maintaining circuit for the starter or relay which is independent of the contact member 280 and contact post 281 of the high pressure controller 248. This maintaining circuit may be traced from the line wire 307 through contact terminal 285, contact member 283, terminal 284, electrodes 330 and 329 of the temperature responsive controller 252, wire 332, electrodes 318 and 320 of the temperature responsive controller 251, terminal 305, contact post 300, bridge member 299, contact post 301, contacts 295 of the overload cut-out 249, operating coil 298, and terminal 306 back to the other line wire 308. Completion of this maintaining circuit maintains the relay or starter 250 energized and hence the refrigerating apparatus in operation until either the high pressure rises to 185 lbs. which would cause separation of the contact member 283 from the contact terminal 285, or until the ice formation completely encircles the bulb 324 which would cause the mercury to separate from the electrodes 329 and 330 of the temperature responsive controller 252, or until the temperature of the cooling fluid 231 decreases to 35°.

If when the temperature responsive controller 251 places the refrigerating apparatus in operation, as pointed out above, and the low pressure is between 18 and 28 lbs., say 23 lbs., so as to cause the contact 262 to engage the contact member 263, a second and parallel maintaining circuit for the operating coil 298 of the relay is obtained. This second or parallel maintaining circuit may be traced from the line wire 307 through contact terminal 285, contact member 283, terminal 284, electrodes 330 and 329 of the temperature responsive controller 252, terminal 264, contact member 263, contact 262, terminal post 300, bridge member 299, terminal post 301, contacts 295 of the overload cut-out 249, operating coil 298 and terminal 306 back to the other line wire 308. By reason of this parallel maintaining circuit, the refrigerating apparatus may be maintained in operation until the low pressure decreases to 18 lbs. regardless of whether the temperature of the cooling fluid has been decreased to 35°.

From the above, it is seen that in this modification as in the modifications shown by Figures 1 and 6, the refrigerating apparatus is placed in operation when the high pressure decreases to a predetermined value (135 lbs.), and either the temperature being controlled rises to a predetermined value (38°), or the low pressure rises to a predetermined value (28 lbs.) and is maintained in operation until either the high pressure rises to a predetermined higher value (185 lbs.), or until both the temperature being controlled decreases to a predetermined lower value (35°) and the suction pressure decreases to a predetermined lower value (18 lbs.). All of the above referred to starting and maintaining circuits pass through the contacts 295 of the overload cut-out 249 so that the refrigerating apparatus is shut down upon the occurrence of overload conditions. Accordingly, it is seen that the control arrangement of Figure 7 may be utilized for controlling the operation of the fixtures of Figures 1 and 6, and likewise the control arrangements of Figures 1 and 6 may be utilized for controlling the operation of the fixtures of Figure 7. In Figure 7, the temperature responsive controller 252 responding to the depth of ice formation on the evaporator means 240 is located in both the starting and maintaining circuits for the relay or starter 250 so that when the ice formation reaches a predetermined depth the refrigerating apparatus is shut down. This is particularly useful since there is no need in operating the refrigerating apparatus when there is a sufficient ice formation to carry the cooling load. Provision may also be made in Figure 7 for preventing automatic resetting of the refrigerating apparatus in case the high pressure rises to such a high value (185 lbs.) as to shut down the refrigerating apparatus. Under certain circumstances, this may prove beneficial and this manual reset mechanism may be utilized if desired.

As pointed out above, the temperature responsive controller 252 is located in the starting circuits and the maintaining circuits controlled by both the low pressure controller 247 and the temperature controller 251 so that neither one of these controllers may cause operation of the refrigerating apparatus in case the ice formation assumes a predetermined thickness. It may be desirable at times to allow the temperature responsive controller 251 to start the refrigerating apparatus in operation and continue it in operation even though there is a sufficiently deep formation of ice on the evaporator means 240. This may be accomplished by omitting the wire 332 and substituting therefor the wire 333. With this arrangement, the starting and maintaining circuits controlled by the temperature responsive controller 251 are entirely independent of the temperature responsive controller 252, and these starting and maintaining circuits may be traced from the line wire 307 through contact terminal 285, contact member 283, terminal 284, wire 333, electrodes 318 and 319 of the mercury switch 317 for the starting circuit and electrodes 318 and 320 of the mercury switch 317 for the maintaining circuits.

By reason of the arrangement of Figure 7, the temperature of the cooling fluid may be maintained at desired values for cooling a substance, such as milk, inserted therein and an ice formation may be built up on the evaporator means 240 to provide a predetermined amount of ice on the evaporator means which may absorb a large amount of heat from the substance immediately upon its insertion in the cooling fluid 231. Such an arrangement is only intermittently used and by building up this ice formation in the economical manner pointed out above, a smaller capacity refrigerating apparatus may be utilized which again increases the economy of operation.

Referring now to Figure 8, there is disclosed a slightly different manner for accomplishing substantially the same results as are accomplished in Figure 7. In Figure 8 a portion of the fixture 230 and the evaporator means 240 is shown. The same unitary control arrangement 245 is utilized and accordingly like reference characters for like parts are set forth. The modification of Figure 8 differs from that of Figure 7 by the use of a single temperature responsive controller generally designated at 335 instead of the two temperature responsive controllers 251 and 252 of Figure 7.

The temperature responsive controller 335 may comprise a bellows 336 connected by a capillary tube 337 to a bulb 338 carried adjacent to the evaporator means 240 by a suitable bracket 339. The bulb 338, capillary tube 337 and bellows 336 preferably contains a volatile fluid so that the bellows 336 is expanded upon an increase in temperature affecting the bulb 338. The bellows 336 operates a pivoted lever 340 against the action of a tension spring 341 and the lever 340 operates a mercury switch 342 having electrodes 343, 344, 345 and 346. When the temperature affecting the bulb 338 is below 30°, the switch is in the position shown in Figure 8. When the temperature rises to 31°, the switch is tilted to cause the mercury in the mercury switch to bridge the electrodes 345 and 346 and these electrodes will remain bridged until such time as the temperature decreases below 30°. When the temperature increases to 35°, the mercury switch 342 is tilted to cause the mercury therein to bridge all of the electrodes 343, 344, 345, and 346 and all of these electrodes remain bridged until such time as the temperature decreases to 33°, at which time the electrodes 343 and 344 are unbridged while the electrodes 345 and 346 remain bridged.

Electrode 343 is connected to the terminal 267 of the unitary control arrangement 245, the electrode 344 is connected to the control terminal 305, the electrode 345 is connected to the terminal 264, and the electrode 346 is connected to the terminal 284.

With the parts in the position shown in Figure 8, the depth of the ice formation about the evaporator means 240 is such that the bulb 338 is completely encased thereby. The mass of ice may be below 30° and as a result the mercury switch 342 is in the position shown in Figure 8, the relay or starter 250 is deenergized and the compressor is stopped. With the compressor stopped, the ice formation begins to melt in cooling the cooling fluid 231. The bulb 338 thereupon becomes exposed to the cooling fluid 231 and when the temperature of the bulb 338 rises to 31° to cause the mercury in the mercury switch 342 to bridge the electrodes 345 and 346, a circuit is completed from the line wire 307 through terminal 285, contact member 283, terminal 284, electrodes 346 and 345, terminal 264, contact member 263, contacts 262 and 265, contact members 266 and 280, contact post 281, contact post 301, contacts 295 of the overload cut-out 249, operating coil 298, and terminal 306 back to the other line wire 308. Completion of this circuit causes energization of the operating coil 298 of the starter 250 to start the compressor and to move the bridge member 299 into engagement with the contacts 300 and 301.

Movement of the bridge member 299 into engagement with the contacts 300 and 301 completes a maintaining circuit which may be traced from the line wire 307 through contact terminal 285, contact member 283, terminal 284, electrodes 346 and 345 of the mercury switch 342, terminal 264, contact member 263, contact 262, terminal post 300, bridge member 297, terminal post 301, contacts 295 of the overload cut-out 249, operating coil 298, and terminal 306 back to the other line wire 308. This maintaining circuit maintains the compressor in operation until such time as the contact member 283 is moved out of engagement with the contact terminal 285 or the mercury in the mercury switch 342 disengages the electrodes 345 and 346, or until the contact member 263 is moved out of engagement with the contact 262. Accordingly, when the ice formation decreases in depth so as to cause the bulb 338 to be exposed to the cooling fluid 231 resulting in a rise in temperature thereof to 31° and when the low pressure has risen to 28 lbs. and the high pressure has decreased to 135 lbs., the compressor is placed in operation. After the compressor has thus been placed in operation, it is maintained in operation until such time as the high pressure increases to 185 lbs., or the low pressure decreases to 18 lbs., or the ice formation becomes sufficiently thick to encase the bulb 338 with a resulting temperature drop therein to below 30°. In this manner the compressor is operated in accordance with variations in low pressure to maintain a predetermined depth of ice on the evaporator means 240.

Assume now that a substance to be cooled such as milk is inserted in the cooling fluid 231, this relatively warm substance increases the temperature of the cooling fluid and causes comparatively fast melting of the ice on the evaporator means 240. The bulb 338 of the temperature responsive controller 335 is thereupon exposed to the cooling fluid and if at this time the low pressure is at or above 28 lbs. the compressor will be placed in operation in the manner pointed out above. If, however, the low pressure is not at or above 28 lbs., the compressor will not be placed in operation until such time as the temperature affecting the bulb 338 shall rise to 35°. When this occurs the mercury within the mercury switch 342 bridges all four electrodes therein to complete a starting circuit from the line wire 307 through contact terminal 285, contact member 283, terminal 284, electrode 346, electrode 343, terminal 267, contact member 280, contact post 281, contact post 301, contacts 295 of the overload cut-out 249, operating coil 298, and terminal 306 back to the other line wire 308. Completion of this circuit energizes the operating coil 298 to move the bridge member 299 into engagement with contacts 300 and 301 and to start operation of the compressor motor.

Movement of the bridge member 299 into engagement with contacts 300 and 301 completes a maintaining circuit which may be traced from the line wire 307 through contact terminal 285, contact member 283, terminal 284, electrode 346, electrode 344, control terminal 305, contact post 300, bridge member 299, contact post 301, contacts 295 of the overload cut-out 249, operating coil 298 and terminal 306 back to the other line wire 308. This maintaining circuit maintains the refrigerating apparatus in operation until the temperature affecting the bulb 338 decreases to 33° or until the high pressure rises to 185 lbs. In this manner, the temperature of the cooling fluid 231 is maintained between 33 and 35°.

It is here pointed out that once the refrigerating apparatus is placed in operation either by a rise in suction pressure to 28 lbs. or by an increase in temperature affecting the bulb 338 to 35°, the compressor is maintained in operation until both the suction pressure decreases to 18 lbs. and the temperature affecting the bulb 338 decreases to 33°. It is readily apparent that the operation of the structure of Figure 8 is substantially the same as that of Figure 7 and therefore a further description is not considered necessary. It may however be pointed out that the temperature limits of 33 to 35° affecting the bulb 338 of Figure 8 will maintain the temperature of the cooling fluid at a point remote from the evaporator means 240 at substantially 35° to 38° as is done by the temperature responsive controller 251 in Figure 7. If desired the unitary control arrangement 245 of Figure 8 may be provided with the manual reset lever 286 of Figure 7 so that manual resetting of the lever 286 is necessary to start the compressor in case the compressor is shut down as a result of a rise in head pressure to 185 lbs.

While the control arrangements of Figures 7 and 8 for application to milk coolers give complete automatic control, small milk cooling units may not stand the expense of such a complete control arrangement. In other words, on small units of this general type it may be advisable to have a semi-automatic control arrangement and such an arrangement is diagrammatically illustrated in Figure 9. Here the same unitary control arrangement 245 is utilized as in Figures 7 and 8 for controlling the operation of a compressor associated with a fixture of the milk cooler type as illustrated in Figure 7. Accordingly, like reference characters for the like parts of the unitary control arrangement 245 have been utilized. In Figure 9 the terminals 284 and 264 are electrically connected together and a manual momentary switch generally designated at 350 is utilized for placing the compressor in operation when the low pressure is at an intermediate value. This manual momentary switch may comprise a manually operated bridge member 351 for momentarily engaging contacts 352 and 353. Contact 352 is connected to the control terminal 305 and contact 353 is connected to the terminal 267.

Assume now that the low pressure rises to 28 lbs. and that the high pressure decreases to 135 lbs., a circuit is completed from the line wire 307 through contact terminal 285, contact member 283, terminal 284, terminal 264, contact member 263, contacts 262 and 265, contact members 266 and 280, contact post 281, contact post 301, contacts 295 of the overload cut-out 249, operating coil 298, and terminal 306 back to the other line wire 308. Completion of this circuit operates the compressor and moves the bridge member 299 into engagement with the contact posts 300 and 301 to complete a maintaining circuit from the line wire 307 through contact terminal 285, contact member 283, terminals 284 and 264, contact member 263, contact 262, contact post 300, bridge member 299, contact post 301, contacts 295 of the overload cut-out 249, operating coil 298, and terminal 306 back to the other line wire 308. Completion of this maintaining circuit maintains the compressor in operation until either the low pressure decreases to 18 lbs. or the high pressure increases to 185 lbs. In this manner the unitary control arrangement 245 operates in accordance with variations in low pressure to build up an ice formation on the submerged portion of the evaporator means 240 of the fixture 230 of Figure 7.

Assume now that a substance to be cooled such as milk is immersed in the cooling fluid 231 when the compressor is not operating. At this time the liquid refrigerant is in the lower part of the evaporator means and insulated by the ice formation from any changes in the cooling fluid temperature. The temperature of the cooling fluid increases, but before this increase in temperature is felt by the suction pressure control, considerable ice may be melted off of the evaporator means before any refrigeration is accomplished by the refrigerating apparatus. In order to prevent this and place the refrigerating apparatus in operation even though the suction pressure has not risen to 28 lbs. when the substance to be cooled is immersed in the cooling fluid, the manually operated switch 350 is utilized. Accordingly, when it is desired to place the substance to be cooled in the cooling fluid 231, the manually operating switch 250 is closed to complete a starting circuit which may be traced from the line wire 307 through contact terminal 285, contact member 283, terminals 284 and 264, contact member 263, contact 262, terminal post 300, control terminal 305, contact 352, bridge member 351, contact 353, terminal 267, contact member 280, contact post 281, contact post 301, contacts 295 of the overload cut-out 249, operating coil 298 and terminal 306 back to the other line wire 308. Completion of this starting circuit pulls in the starter 250 to operate the compressor and moves the bridge member 299 into engagement with the contacts 300 and 301 to complete the above referred to maintaining circuit. Accordingly, when the manual switch 350 is closed the refrigerating apparatus is placed in operation. Placing of the refrigerating apparatus in operation by the manual switch, causes circulation of refrigerant which immediately absorbs heat in the upper portion of the evaporator means to increase the suction pressure. This insures that the refrigeration apparatus remains in operation until the entire evaporation means is reduced to the desired temperature or pressure.

By reason of the arrangement of Figure 9 an ice formation is built up on the evaporator means in accordance with variations in low pressure and when it is desired to insert a substance to be cooled in the cooling fluid the compressor may be placed in operation manually whereby the cooling action of the refrigerating apparatus may be hastened appreciably.

Although for purposes of illustration various forms of this invention have been disclosed, other forms thereof may become apparent to those skilled in the art upon reference to this disclosure and accordingly this invention is to be limited only by the scope of the appended claims and prior art.

I claim as my invention:

1. In a mechanical refrigerating apparatus having a compressor and evaporator means for controlling the temperature condition of a medium, the combination of, means responsive to the temperature condition of the medium being controlled by the evaporator means, means responsive to a condition which is a measure of the temperature of the evaporator means, control means controlled by both of said condition responsive means for starting the compressor when either the temperature condition of the medium being controlled by the evaporator means or the condition which is a measure of the temperature of the evaporator means rise to predetermined values and for continuing operation of the compressor until both the temperature condition of the medium being controlled by the evaporator means and the condition which is a measure of the temperature of the evaporator means decrease to predetermined lower values.

2. In a mechanical refrigerating apparatus having a compressor and evaporator means for controlling the temperature condition of a medium, the combination of, means responsive to the temperature condition of the medium being controlled by the evaporator means, means responsive to the pressure on the low pressure side of the refrigerating apparatus, control means controlled by both of said condition responsive means for starting the compressor when either the temperature condition of the medium being controlled by the evaporator means or the pressure on the low pressure side rises to a predetermined value and for maintaining the compressor in operation until both the temperature condition of the medium being controlled by the evaporator means and the pressure on the low pressure side decrease to predetermined lower values.

3. In a mechanical refrigerating apparatus having a compressor and evaporator means for controlling the temperature condition of a medium, the combination of, means responsive to the temperature condition of the medium being controlled by the evaporator means, means responsive to the pressure on the low pressure side of the refrigerating apparatus, means responsive to the pressure on the high pressure side of the refrigerating apparatus, and control means for the compressor controlled by all of said responsive means to start the compressor only when the pressure on the high pressure side decreases to a predetermined low value and either the temperature condition being controlled by the evaporator means rises to a predetermined value or the pressure on the low pressure side rises to a predetermined value.

4. In a mechanical refrigerating apparatus having a compressor and evaporator means for controlling the temperature condition of a medium, the combination of, means responsive to the temperature condition of the medium being controlled by the evaporator means, means responsive to the pressure on the low pressure side of the refrigerating apparatus, means responsive to the pressure on the high pressure side of the refrigerating apparatus, and control means for the compressor controlled by all of said responsive means to start the compressor only when the pressure on the high pressure side decreases to a predetermined low value and either the temperature condition of the medium being controlled by the evaporator means rises to a predetermined value or the pressure on the low pressure side rises to a predetermined value and to continue the compressor in operation until the pressure on the high pressure side rises to a predetermined higher value or until both the temperature condition of the medium being controlled by the evaporator means and pressure on the low pressure side decrease to predetermined lower values.

5. In a refrigerating apparatus having a compressor and evaporator means for performing a cooling function, the combination of, first control means movable between starting and stopping positions, second control means responsive to the pressure on the low pressure side of the refrigeration apparatus and movable to a starting position when the pressure on the low pressure side increases to a predetermined value and movable to a stopping position when the pressure on the low pressure side decreases to a predetermined lower value, third control means responsive to the pressure on the high pressure side of the refrigerating apparatus and movable to a starting position when the pressure on the high pressure side decreases to a predetermined value and movable to a stopping position when the pressure on the high pressure side increases to a predetermined higher value, and means for controlling the operation of the compressor controlled by all of said control means to start the compressor only when the third control means is moved to the starting position and either the first or second control means is moved to the starting positions.

6. In a refrigerating apparatus having a compressor and evaporator means for performing a cooling function, the combination of, first switching means, means for moving the first switching means to a starting position, second switching means, means responsive to the pressure on the low pressure side of the refrigerating apparatus for moving the second switching means to a starting position when the pressure on the low pressure side increases to a predetermined value and to a stopping position when the pressure on the low pressure side decreases to a predetermined lower value, third switching means, means responsive to the pressure on the high pressure side of the refrigerating apparatus for moving the third switching means to a starting position when the pressure on the high pressure side decreases to a predetermined value and to a stopping position when the pressure on the high pressure side increases to a predetermined higher value, and control means for the compressor controlled by all of the switching means to start the compressor only when the third switching means is moved to the starting position and either the first or second switching means is moved to the starting position.

7. In a refrigerating apparatus having a compressor and evaporator means for controlling the temperature condition of a medium, the combination of, first switching means, means responsive to the temperature condition of the medium being controlled by the evaporator means for moving the first switching means to a starting position when the temperature condition rises to a predetermined value and to a stopping position when the temperature condition decreases to a predetermined lower value, second switching means, means responsive to the pressure on the low pressure side of the refrigerating apparatus for moving the second switching means to a starting position when the pressure on the low pressure side rises to a predetermined high pressure and to a stopping position when the pressure on the low pressure side decreases to a predetermined lower value, and control means for the compressor controlled by both switching means to start the compressor when either the first or second switching means are moved to the starting position and to continue operation of the compressor until both the first and second switching means are moved to the stopping position.

8. In a refrigerating apparatus having a compressor and evaporator means for controlling the temperature condition of a medium, the combination of, first switching means, means responsive to the temperature condition of the medium being controlled by the evaporator means for moving the first switching means to a starting position when the temperature condition rises to a predetermined value and to a stopping position when the temperature condition decreases to a predetermined lower value, second switching means, means responsive to the pressure on the low pressure side of the refrigerating apparatus for moving the second switching means to a starting position when the pressure on the low pressure side rises to a predetermined high pressure and to a stopping position when the pressure on the low pressure side decreases to a predetermined lower value, third switching means, means responsive to the pressure on the high pressure side of the refrigerating apparatus for moving the third switching means to a starting position when the pressure on the high pressure side decreases to a predetermined low value and to a stopping position when the pressure on the high pressure side increases to a predetermined higher value, and control means for the compressor controlled by all of the switching means to start the compressor only when the third switching means is moved to the starting position and either the first or second switching means are moved to the starting position and to continue operation of the compressor until either the third switching means moves to the stopping position or the first and second switching means both move to the stopping positions.

9. In combination, a fixture having a storage chamber and a cooler, a mechanical refrigerating apparatus therefor including a compressor and evaporator means, the evaporator means cooling the storage chamber and the cooler, means responsive to the temperature of the storage chamber, means responsive to the pressure on the low pressure side of the refrigerating apparatus, means responsive to the pressure on the high pressure side of the refrigerating apparatus, and control means controlled by all of said responsive means to start the compressor only when the pressure on the high pressure side decreases to a predetermined value and either the temperature of the storage chamber increases to a predetermined value or the pressure on the low pressure side increases to a predetermined value and to continue the compressor in operation until either the pressure on the high pressure side increases to a predetermined higher value or the storage chamber temperature and the pressure on the low pressure side both decrease to predetermined lower values.

10. In combination, a fixture having a storage chamber and a cooler, a mechanical refrigerating apparatus therefor including a compressor and evaporator means, the evaporator means extending serially through the storage chamber and the cooler for cooling the same, means responsive to the temperature of the storage chamber, means responsive to the pressure on the low pressure side of the refrigerating apparatus, means responsive to the pressure on the high pressure side of the refrigerating apparatus, and control means controlled by all of said responsive means to start the compressor only when the pressure on the high pressure side decreases to a predetermined value and either the temperature of the storage chamber increases to a predetermined value or the pressure on the low pressure side increases to a predetermined value and to continue the compressor in operation until either the pressure on the high pressure side increases to a predetermined higher value or the storage chamber temperature and the pressure on the low pressure side both decrease to predetermined lower values.

11. In combination, a fixture having a storage chamber and a cooler, a mechanical refrigerating apparatus therefor including a compressor and evaporator means, said evaporator means including parallel connected coils, one for cooling the storage chamber and the other for cooling the cooler, means responsive to the temperature of the storage chamber, means responsive to the pressure on the low pressure side of the refrigerating apparatus, means responsive to the pressure on the high pressure side of the refrigerating apparatus, and control means controlled by all of said responsive means to start the compressor only when the pressure on the high pressure side decreases to a predetermined value and either the temperature of the storage chamber increases to a predetermined value or the pressure on the low pressure side increases to a predetermined value and to continue the compressor in operation until either the pressure on the high pressure side increases to a predetermined higher value or the storage chamber temperature and the pressure on the low pressure side both decrease to predetermined lower values.

12. In combination, a fixture for making and storing a frozen confection having a freezing device including an agitator and a storage compartment, a mechanical refrigerating apparatus therefor, including a compressor and evaporator means, said evaporator means including parallel connected coils, one for cooling the storage compartment and the other for cooling the freezing device, a valve for normally preventing the circulation of refrigerant through the coil of the freezing device, means responsive to the temperature of the storage compartment, means responsive to the pressure on the high pressure side of the refrigerating apparatus, means responsive to the pressure on the low pressure side of the refrigerating apparatus, means for operating the agitator and for opening the valve for performing a freezing operation resulting in an increase in pressure on the low pressure side of the refrigerating apparatus, and control means for the compressor controlled by all of said responsive means to start the compressor when the pressure on the high pressure side decreases to a predetermined value and either the storage compartment temperature or the pressure on the low pressure side increase to predetermined values and for continuing the compressor in operation until either the pressure on the high pressure side increases to a predetermined higher value or both the storage compartment temperature and the pressure on the low pressure side decrease to predetermined lower values.

13. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the high pressure side of the refrigerating apparatus, means responsive to the pressure on the low pressure side of the refrigerating apparatus, control means movable to an operating position, and means for controlling the operation of the compressor controlled by said control means and both of said responsive means to start the compressor when the pressure on the high pressure side decreases to a predetermined value and either the control means is moved to the operating position or the pressure on the low pressure side increases to a predetermined value and for continuing the compressor in operation until either the pressure on the high pressure side increases to a predetermined higher value or both the pressure on the low pressure side decreases to a predetermined value and the control means is moved away from the operating position.

14. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the high pressure side of the refrigerating apparatus, means responsive to the pressure on the low pressure side of the refrigerating apparatus, means responsive to the temperature of the cooling fluid, and control means for the compressor controlled by all of the responsive means to start the compressor when the pressure on the high pressure side decreases to a predetermined value and either the pressure on the low pressure side or the cooling fluid temperature increases to predetermined values and for maintaining the compressor in operation until either the pressure on the high pressure side increases to a predetermined higher value or both the pressure on the low pressure side and the cooling fluid temperature decrease to predetermined lower values.

15. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the high pressure side of the refrigerating apparatus, means responsive to the pressure on the low pressure side of the refrigerating apparatus, means responsive to the temperature of the cooling fluid, control means for the compressor controlled by all of the responsive means to start the compressor when the pressure on the high pressure side decreases to a predetermined value and either the pressure on the low pressure side or the cooling fluid temperature increases to predetermined values and for maintaining the compressor in operation until either the pressure on the high pressure side increases to a predetermined higher value or both the pressure on the low pressure side and the cooling fluid temperature decrease to predetermined lower values, and means for preventing the low pressure responsive means from controlling the control means to start the compressor when ice forms to a predetermined thickness on the evaporator means.

16. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the high pressure side of the refrigerating apparatus, means responsive to the pressure on the low pressure side of the refrigerating apparatus, means responsive to the temperature of the cooling fluid, control means for the compressor controlled by all of the responsive means to start the compressor when the pressure on the high pressure side decreases to a predetermined value and either the pressure on the low pressure side or the cooling fluid temperature increases to predetermined values and for maintaining the compressor in operation until either the pressure on the high pressure side increases to a predetermined higher value or both the pressure on the low pressure side and the cooling fluid temperature decrease to predetermined lower values, and means for preventing either the low pressure responsive means or the cooling fluid temperature responsive means from controlling the control means to start the compressor when ice forms to a predetermined thickness on the evaporator means.

17. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the high pressure side of the refrigerating apparatus, means responsive to pressure on the low pressure side of the refrigerating apparatus, means responsive to the temperature of the cooling fluid, separate means responsive to the thickness of the ice formation on the evaporator means, and control means for the compressor controlled by all of the responsive means to start the compressor when the ice formation is less than a predetermined amount, when the pressure on the high pressure side decreases to a predetermined value and when either the pressure on the low pressure side or cooling fluid temperature increase to predetermined values.

18. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the high pressure side of the refrigerating apparatus, means responsive to pressure on the low pressure side of the refrigerating apparatus, means responsive to the temperature of the cooling fluid and the thickness of the ice formation on the evaporator means including a thermostatic element located adjacent the evaporator means, and control means for the compressor controlled by all of the responsive means to start the compressor when the ice formation is less than a predetermined amount, when the pressure on the high pressure side decreases to a predetermined value and when either the pressure on the low pressure side or cooling fluid temperature increase to predetermined values.

19. A control system for a refrigerating apparatus having a compressor and evaporator means for performing a cooling function, the combination of, first switching means, manual means for moving the first switching means to a starting position, second switching means, means responsive to the pressure on the low pressure side of the refrigerating apparatus for moving the second switching means to a starting position when the pressure on the low pressure side increases to a predetermined value and to a stopping position when the pressure on the low pressure side decreases to a predetermined lower value, third switching means, means responsive to the pressure on the high pressure side of the refrigerating apparatus for moving the third switching means to a starting position when the pressure on the high pressure side decreases to a predetermined value and to a stopping position when the pressure on the high pressure side increases to a predetermined higher value, and control means for the compressor controlled by all of the switching means to start the compressor only when the third switching means is moved to the starting position and either the first or second switching means is moved to the starting position.

20. A control system for a refrigerating apparatus having a compressor and evaporator means for performing a cooling function, the combination of, means responsive to the pressure on the high pressure side of the refrigerating apparatus, control means, means controlled by the control means and the high pressure responsive means for starting the compressor only when the pressure on the high pressure side decreases to a predetermined value and the control means calls for operation of the compressor and continuing the compressor in operation until the control means no longer calls for operation of the compressor or the pressure on the high pressure side increases to a predetermined higher value, means for preventing restarting of the compressor when the compressor is stopped by the high pressure responsive means occasioned by an increase in high pressure to the predetermined higher value, and means for releasing said last mentioned means whereby the compressor may be restarted.

21. In combination, a fixture having a storage chamber and a cooler, a mechanical refrigerating apparatus therefor including a compressor and evaporator means, the evaporator means cooling the storage chamber and the cooler, means responsive to the temperature of the storage chamber, means responsive to the pressure on the low pressure side of the refrigerating apparatus, and control means controlled by both of said responsive means to start the compressor when either the temperature of the storage chamber increases to a predetermined value or the pressure on the low pressure side increases to a predetermined value and to continue the compressor in operation until both the storage chamber temperature and the pressure on the low pressure side decrease to predetermined lower values.

22. In combination, a fixture having a storage chamber and a cooler, a mechanical refrigerating apparatus therefor including a compressor and evaporator means, the evaporator means extending serially through the storage chamber and the cooler for cooling the same, means responsive to the temperature of the storage chamber, means responsive to the pressure on the low pressure side of the refrigerating apparatus, and control means controlled by both of said responsive means to start the compressor when either the temperature of the storage chamber increases to a predetermined value or the pressure on the low pressure side increases to a predetermined value and to continue the compressor in operation until both the storage chamber temperature and the pressure on the low pressure side decrease to predetermined lower values.

23. In combination, a fixture having a storage chamber and a cooler, a mechanical refrigerating apparatus therefor including a compressor and evaporator means, said evaporator means including parallel connected coils, one for cooling the storage chamber and the other for cooling the cooler, means responsive to the temperature of the storage chamber, means responsive to the pressure on the low pressure side of the refrigerating apparatus, and control means controlled by both of said responsive means to start the compressor when either the temperature of the storage chamber increases to a predetermined value or the pressure on the low pressure side increases to a predetermined value and to continue the compressor in operation until both the storage chamber temperature and the pressure on the low pressure side decrease to predetermined lower values.

24. In combination, a fixture for making and storing a frozen confection having a freezing device including an agitator and a storage compartment, a mechanical refrigerating apparatus therefor, including a compressor and evaporator means, said evaporator means including parallel connected coils, one for cooling the storage compartment and the other for cooling the freezing device, a valve for normally preventing the circulation of refrigerant through the coil of the freezing device, means responsive to the temperature of the storage compartment, means responsive to the pressure on the low pressure side of the refrigerating apparatus, means for operating the agitator and for opening the valve for performing a freezing operation resulting in an increase in pressure on the low pressure side of the refrigerating apparatus, and control means for the compressor controlled by both of said responsive means to start the compressor when either the storage compartment temperature or the pressure on the low pressure side increases to predetermined values and for continuing the compressor in operation until both the storage compartment temperature and the pressure on the low pressure side decrease to predetermined lower values.

25. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the low pressure side of the refrigerating apparatus, control means movable to an operating position, and means for controlling the operation of the compressor controlled by said control means and said responsive means to start the compressor when either the control means is moved to the operating position or the pressure on the low pressure side increases to a predetermined value and for continuing the compressor in operation until both the pressure on the low pressure side decreases to a predetermined low value and the control means is moved away from the operating position.

26. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the low pressure side of the refrigerating apparatus, means responsive to the temperature of the cooling fluid, and control means for the compressor controlled by both of the responsive means to start the compressor when either the pressure on the low pressure side or the cooling fluid temperature increases to predetermined values and for maintaining the compressor in operation until both the pressure on the low pressure side and the cooling fluid temperature decrease to predetermined lower values.

27. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the low pressure side of the refrigerating apparatus, means responsive to the temperature of the cooling fluid, control means for the compressor controlled by both of the responsive means to start the compressor when either the pressure on the low pressure side or the cooling fluid temperature increases to predetermined values and for maintaining the compressor in operation until both the pressure on the low pressure side and the cooling fluid temperature decrease to predetermined lower values, and means for preventing the low pressure responsive means from controlling the control means to start the compressor when ice forms to a predetermined thickness on the evaporator means.

28. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to the pressure on the low pressure side of the refrigerating apparatus, means responsive to the temperature of the cooling fluid, control means for the compressor controlled by both of the responsive means to start the compressor when either the pressure on the low pressure side or the cooling fluid temperature increases to predetermined values and for maintaining the compressor in operation until both the pressure on the low pressure side and the cooling fluid temperature decrease to predetermined lower values, and means for preventing the low pressure responsive means or the cooling fluid temperature responsive means from controlling the control means to start the compressor when ice forms to a predetermined thickness on the evaporator means.

29. In combination a fixture for cooling a substance having a chamber containing a cooling fluid in which the substance to be cooled is placed, a mechanical refrigerating apparatus therefor including a compressor and evaporator means, said evaporator means being at least partly immersed in said cooling fluid, means responsive to pressure on the low pressure side of the refrigerating apparatus, means responsive to the temperature of the cooling fluid, separate means responsive to the thickness of the ice formation on the evaporator means, and control means for the compressor controlled by all of the responsive means to start the compressor when the ice formation is less than a predetermined amount and when either the pressure on the low pressure side or cooling fluid temperature increases to predetermined values.

30. In combination a fixture for cooling a substance heaving a chamber containing a cooling fluid in which the substance to be cooled is placed, a mechanical refrigerating apparatus therefor including a compressor and evaporator means, said evaporator means being at least partly immersed in said cooling fluid, means responsive to pressure on the low pressure side of the refrigerating apparatus, means responsive to the temperature of the cooling fluid and the thickness of the ice formation on the evaporator means including a thermostatic element located adjacent the evaporator means, and control means for the compressor controlled by all of the responsive means to start the compressor when the ice formation is less than a predetermined amount and when either the pressure on the low pressure side or cooling fluid temperature increases to predetermined values.

ALWIN B. NEWTON.